(12) United States Patent
Tang et al.

(10) Patent No.: US 11,412,469 B2
(45) Date of Patent: Aug. 9, 2022

(54) METHOD AND DEVICE FOR SELECTING TRANSMISSION TIME USED TO SEND FEEDBACK INFORMATION

(71) Applicant: GUANGDONG OPPO MOBILE TELECOMMUNICATIONS CORP., LTD., Guangdong (CN)

(72) Inventors: Hai Tang, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 68 days.

(21) Appl. No.: 16/911,340

(22) Filed: Jun. 24, 2020

(65) Prior Publication Data
US 2020/0329445 A1 Oct. 15, 2020

Related U.S. Application Data

(63) Continuation of application No. PCT/CN2017/119137, filed on Dec. 27, 2017.

(51) Int. Cl.
*H04W 56/00* (2009.01)
*H04W 4/44* (2018.01)
(Continued)

(52) U.S. Cl.
CPC ........... *H04W 56/001* (2013.01); *H04W 4/44* (2018.02); *H04W 28/0268* (2013.01); *H04W 72/0446* (2013.01); *H04W 92/18* (2013.01)

(58) Field of Classification Search
CPC . H04W 56/001; H04W 4/44; H04W 28/0268; H04W 72/0446; H04W 92/18;
(Continued)

(56) References Cited

U.S. PATENT DOCUMENTS

2013/0322413 A1 12/2013 Pelletier et al.
2017/0311291 A1 10/2017 Dai et al.
(Continued)

FOREIGN PATENT DOCUMENTS

CN 106612561 * 10/2015
CN 105187153 A 12/2015
(Continued)

OTHER PUBLICATIONS

First Office Action of the European application No. 17936313.0, dated Jul. 13, 2021. 4 pages.
(Continued)

*Primary Examiner* — Mewale A Ambaye
(74) *Attorney, Agent, or Firm* — Perkins Coie LLP (57) ABSTRACT

A method and device for information feedback are provided; the method includes: a first terminal receiving data sent by a second terminal, the data carrying therein first time information; on the basis of the first time information, the first terminal determining a first transmission time for feedback information that corresponds to the data; the first terminal sending the feedback information to the second terminal at the first transmission time. The second terminal sends data to the first terminal; the second terminal determines a candidate time-domain resource set, and detects, in the candidate time-domain resource set, the feedback information sent by the first terminal.

15 Claims, 4 Drawing Sheets

---

A second terminal transmits data to a first terminal — 401

The second terminal determines a candidate time domain resource set, and detects feedback information sent by the first terminal in the candidate time domain resource set — 402

(51) Int. Cl.
*H04W 28/02* (2009.01)
*H04W 72/04* (2009.01)
*H04W 92/18* (2009.01)

(58) Field of Classification Search
CPC ......... H04W 4/46; H04W 4/48; H04W 28/24; H04W 92/20; H04W 92/22
See application file for complete search history.

(56) References Cited

U.S. PATENT DOCUMENTS

| | | | | |
|---|---|---|---|---|
| 2019/0116608 | A1* | 4/2019 | Kim | H04W 72/04 |
| 2021/0021974 | A1* | 1/2021 | Kim | H04W 4/12 |
| 2021/0022116 | A1* | 1/2021 | Lee | H04W 72/02 |
| 2021/0037468 | A1* | 2/2021 | Huang | H04W 76/14 |
| 2021/0051525 | A1* | 2/2021 | Cao | H04W 72/0446 |

FOREIGN PATENT DOCUMENTS

| | | | |
|---|---|---|---|
| CN | 105263195 A | 1/2016 | |
| CN | 105472744 A | 4/2016 | |
| CN | 105991247 A | 10/2016 | |
| CN | 106612561 A | 5/2017 | |
| CN | 106951169 A | 7/2017 | |
| CN | 107294646 A | 10/2017 | |
| EP | 3177094 A1 | 6/2017 | |
| EP | 3177094 A1 * | 6/2017 | ......... H04L 43/0811 |
| EP | 3177094 A4 | 9/2017 | |
| KR | 100691430 B1 | 3/2007 | |
| RU | 2388149 C2 | 4/2010 | |
| RU | 2564532 C2 | 10/2015 | |
| WO | 2017119135 A1 | 7/2017 | |
| WO | 2017162079 A1 | 9/2017 | |
| WO | 2017166984 A1 | 10/2017 | |

OTHER PUBLICATIONS

3GPP TSG RAN WG1 Meeting #90 R1-1713856, Prague, Czechia Aug. 21-25, 2017, Source: Panasonic; Title: Discussion on sidelink feedback in FeD2D. 3 pages.

First Office Action of the Chinese application No. 202010796759.0, dated Aug. 31, 2021. 21 pages with English translation.
International Search Report in the international application No. PCT/CN2017/119137, dated Sep. 30, 2018.
First Office Action of the Russian application No. 2020124671, dated Feb. 4, 2021.
"3GPP; Technical Specification Group Radio Access Network; Evolved Universal Terrestrial Radio Access (E-UTRA); Physical layer procedures (Release 14)", 3GPP Standard; Technical Specification; 3GPP TS 36.213, 3GPP, Mobile Competence Centre; 650, Route Des Lucioles; F-06921 Sophia-Antipolis Cedex; France, vol. RAN WG1, No. V14.4.0, Sep. 26, 2017 (Sep. 26, 2017), pp. 391-448, XP051337380, [ retrieved on Sep. 26, 2017].
Supplementary European Search Report in the European application No. 17936313.0, dated Oct. 7, 2020.
Written Opinion of the International Search Authority in the international application No. PCT/CN2017/119137, dated Sep. 30, 2018.
Nokia, Alcatel-Lucent Shanghai Bell, Native sidelink support in flexible frame structure for NR [online], 3GPP TSG-RAN WG1#86 R1-167268, <URL:http://www.3gpp.org/ftp/tsg_ran/WG1_RL1/TSGR1_1274/Docs/R1-167268.zip>, Aug. 12, 2016. 8 pages.
First Office Action of the Japanese application No. 2020-535248, dated Oct. 22, 2021. 10 pages with English translation.
Office Action of the Indian application No. 202027031815, dated Sep. 21, 2021. 6 pages with English translation.
Second Office Action of the Chinese application No. 202010796759.0, dated Nov. 22, 2021. 12 pages with English translation.
Second Office Action of the European application No. 17936313.0, dated Jan. 20, 2022. 4 pages.
Third Office Action of the Chinese application No. 202010796759.0, dated Mar. 21, 2022. 13 pages with English translation.
Written Opinion of the Singaporean application No. 11202006267P, dated Mar. 8, 2022. 8 pages.
Decision of Rejection of the Chinese application No. 202010796759.0, dated Jun. 8, 2022. 12 pages with English translation.
First Office Action of the Korean application No. 10-2020-7021752, dated Jun. 15, 2022. 7 pages with English translation.
Notice of Allowance of the Japanese application No. 2020-535248, dated May 13, 2022. 5 pages with English translation.

* cited by examiner

METHOD AND DEVICE FOR SELECTING TRANSMISSION TIME USED TO SEND FEEDBACK INFORMATION

CROSS-REFERENCE TO RELATED APPLICATION

This is a continuation application of International Patent Application No. PCT/CN2017/119137, filed on Dec. 27, 2017, the contents of which are hereby incorporated by reference in its entirety.

BACKGROUND

A Vehicle-to-Everything (V2X) system uses a Long Term Evolution (LTE)-Device-to-Device (D2D)-based Sidelink (SL) transmission technology. By the use of a terminal-to-terminal direct communication method that is different from a method for receiving or transmitting communication data in a traditional LTE system by a base station, the V2X system has higher spectrum effectiveness and lower transmission delay.

In 3GPP Rel-14, a V2X technology is standardized, and two transmission modes are defined: Mode 3 and Mode 4. In Mode 3, a transmission resource of a terminal is allocated by the base station. In Mode 4, the terminal determines a transmission resource in a sensing and reservation manner.

In a New Radio (NR)-V2X, it is necessary to support autonomous driving, so higher requirements for data interaction between vehicles, such as higher throughput, lower delay, higher reliability, larger coverage, and more flexible resource allocation, are put forward. In order to meet the above requirements, a multi-antenna transmission technology needs to be introduced into the NR-V2X. In the multi-antenna transmission technology, how does a transmitting end select an optimal beam from a plurality of candidate beams is determined based on an index value of the optimal beam fed back by a receiving end.

In addition, the NR-V2X needs to support various transmission methods, such as unicast, groupcast, and broadcast. During unicast transmission, information such as acknowledgement (ACK)/non-acknowledgement (NACK) needs to be fed back by the receiving end, and the transmitting end determines whether retransmission is required based on the feedback information of the receiving end.

Generally, a resource (i.e., a feedback resource) of the feedback information sent by the receiving end is acquired through competition. In a congestion scenario, it may be very difficult for the receiving end to obtain an appropriate feedback resource, or the delay of the obtained feedback resource is relatively large. The feedback information sent by using the feedback resource cannot meet the delay requirement of the transmitting end. In addition, in some scenarios, the transmitting end may not receive the feedback information, and blind detection of the feedback information by the transmitting end will inevitably cause a waste of resources.

SUMMARY

The disclosure relates to the technical field of wireless communications.

In order to solve the above technical problems, the embodiments of the disclosure provide a method and apparatus for information feedback, and a computer storage medium.

A method for information feedback provided by the embodiment of the disclosure may include the following steps.

A first terminal receives data from a second terminal, and the first terminal determines first time information according to the data.

The first terminal determines a first transmission time of feedback information corresponding to the data based on the first time information.

The first terminal transmits the feedback information to the second terminal at the first transmission time.

In the embodiment of the disclosure, the first time information may be used to indicate information of maximum delay of the feedback information received by the second terminal.

In the embodiment of the disclosure, the first terminal may receive the data sent by the second terminal at a second transmission time.

The operation that the first terminal determines the first transmission time of the feedback information corresponding to the data based on the first time information may include the following operations.

The first terminal determines a candidate time domain resource set based on the second transmission time and the first time information.

The first terminal selects the first transmission time used to transmit the feedback information from the candidate time domain resource set.

In the embodiment of the disclosure, the first time information may be carried in a Physical Sidelink Control Channel (PSCCH) or a Physical Sidelink Shared Channel (PSSCH).

In the embodiment of the disclosure, the operation that the first terminal determines the first time information according to the data may include the following operation.

The first terminal determines the first time information according to a first attribute of the data. The first attribute may include at least one of:

priority information of the data, Quality of Service (Qos) information of the data, or delay information of the data.

In the embodiment of the disclosure, the operation that the first terminal determines the first time information according to the first attribute of the data may include the following operation.

The first terminal determines the first time information according to the first attribute and a first correspondence. The first correspondence may indicate that the first time information corresponds to the first attribute.

A method for information feedback provided by the embodiment of the disclosure may include the following steps.

A second terminal transmits data to a first terminal.

The second terminal determines a candidate time domain resource set, and detects feedback information sent by the first terminal in the candidate time domain resource set.

In the embodiment of the disclosure, the second terminal may transmit the data to the first terminal at a second transmission time.

The operation that the second terminal determines the candidate time domain resource set may include the following operation.

The second terminal determines the candidate time domain resource set based on the second transmission time and the first time information.

In the embodiment of the disclosure, the first time information may be used to indicate information of maximum delay of the feedback information received by the second terminal.

In the embodiment of the disclosure, the operation that the second terminal detects the feedback information sent by the first terminal in the candidate time domain resource set may include the following operations.

The second terminal starts a timer after transmitting the data to the first terminal at the second transmission time. A duration of the timer may be determined based on the first time information.

If the second terminal detects the feedback information sent by the first terminal at the first transmission time before the timer times out, the second terminal stops detecting the feedback information and transmits the feedback information to a high-layer entity.

Responsive to that the timer times out, if the second terminal does not detect the feedback information sent by the first terminal, the second terminal stops detecting the feedback information and transmits indication information to the high-layer entity. The indication information may be used to indicate that the second terminal does not detect the feedback information in the candidate time domain resource set.

In the embodiment of the disclosure, the data sent by the second terminal to the first terminal may carry the first time information.

In the embodiment of the disclosure, the first time information may be carried in a PSCCH or a PSSCH.

In the embodiment of the disclosure, the first time information may be determined according to a first attribute of the data sent by the second terminal to the first terminal at the second transmission time.

In the embodiment of the disclosure, the first attribute may include at least one of:
priority information of the data, Qos information of the data, or delay information of the data.

In the embodiment of the disclosure, the operation that the first time information may be determined according to the first attribute of the data sent by the second terminal to the first terminal at the second transmission time may include the following operation.

The first time information may be determined according to the first attribute and a first correspondence. The first correspondence may indicate that the first time information corresponds to the first attribute.

An apparatus for information feedback provided by the embodiment of the disclosure may include the following components:
a receiving unit, configured to receive data from a second terminal;
a determination unit, configured to determine first time information according to the data, and determine a first transmission time of feedback information corresponding to the data based on the first time information; and
a transmitting unit, configured to transmit the feedback information to the second terminal at the first transmission time.

In the embodiment of the disclosure, the first time information may be used to indicate information of maximum delay of the feedback information received by the second terminal.

In the embodiment of the disclosure, the receiving unit may receive the data sent by the second terminal at the second transmission time.

The determination unit may be configured to determine a candidate time domain resource set based on the second transmission time and the first time information, and select the first transmission time used to transmit the feedback information from the candidate time domain resource set.

In the embodiment of the disclosure, the first time information may be carried in a PSCCH or a PSSCH.

In the embodiment of the disclosure, the determination unit may be configured to determine the first time information according to a first attribute of the data. The first attribute may include at least one of:
priority information of the data, Qos information of the data, or delay information of the data.

In the embodiment of the disclosure, the determination unit may be configured to determine the first time information according to the first attribute and a first correspondence. The first correspondence may indicate that the first time information corresponds to the first attribute.

An apparatus for information feedback provided by the embodiment of the disclosure may include the following components:
a transmitting unit, configured to transmit data to a first terminal;
a determination unit, configured to determine a candidate time domain resource set; and
a detection unit, configured to detect feedback information sent by the first terminal in the candidate time domain resource set.

In the embodiment of the disclosure, the transmitting unit may transmit the data to the first terminal at a second transmission time.

The determination unit may be configured to determine the candidate time domain resource set based on the second transmission time and the first time information.

In the embodiment of the disclosure, the first time information may be used to indicate information of maximum delay of the feedback information received by the second terminal.

In the embodiment of the disclosure, the detection unit may be configured to: start a timer after transmitting the data to the first terminal at the second transmission time. A duration of the timer may be determined based on the first time information. If the second terminal may detect the feedback information sent by the first terminal at the first transmission time before the timer times out, the second terminal may stop detecting the feedback information and transmit the feedback information to a high-layer entity. Responsive to that the timer times out, if the second terminal may not detect the feedback information sent by the first terminal, the second terminal may stop detecting the feedback information and transmit indication information to the high-layer entity. The indication information may be used to indicate that the second terminal does not detect the feedback information in the candidate time domain resource set.

In the embodiment of the disclosure, the data sent by the second terminal to the first terminal may carry the first time information.

In the embodiment of the disclosure, the first time information may be carried in a PSCCH or a PSSCH.

In the embodiment of the disclosure, the first time information may be determined according to a first attribute of the data sent by the second terminal to the first terminal at the second transmission time.

In the embodiment of the disclosure, the first attribute may include at least one of:
priority information of the data, Qos information of the data, or delay information of the data.

In the embodiment of the disclosure, the operation that the first time information may be determined according to the first attribute of the data sent by the second terminal to the first terminal at the second transmission time may include the following operation.

The first time information may be determined according to the first attribute and a first correspondence. The first correspondence may indicate that the first time information corresponds to the first attribute.

A computer storage medium provided by the embodiment of the disclosure may store a computer-executable instruction. The computer-executable instruction, when executed by a processor, may implement the above information feedback method.

BRIEF DESCRIPTION OF THE DRAWINGS

Drawings described herein are used for providing further understandings of the disclosure, and constitute one part of this disclosure. Illustrative embodiments and descriptions thereof of the disclosure are used for explaining the disclosure, and do not constitute an improper limitation to the disclosure. In the drawings.

DETAILED DESCRIPTION

In order to understand the features and technical contents of the embodiments of the disclosure in more detail, implementations of the embodiments of the disclosure will be described in detail below with reference to the accompanying drawings. The accompanying drawings are for reference only and are not intended to limit the embodiments of the disclosure.

In order to facilitate understanding of the technical solutions of the embodiments of the disclosure, Mode 3 and Mode 4 in a V2X are respectively explained and illustrated.

Figure 1:
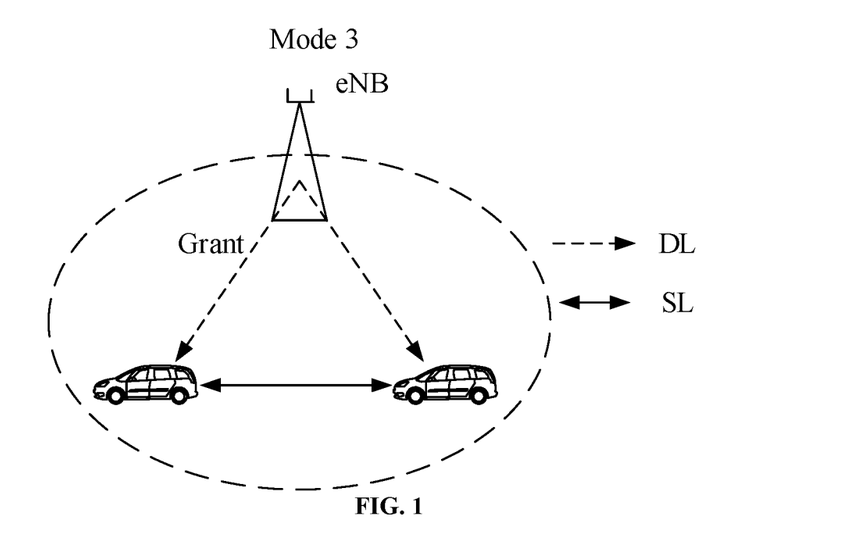
FIG. 1 is a schematic scenario diagram of Mode 3 in a V2X.

Mode 3: as illustrated in FIG. 1, a transmission resource of a vehicle terminal is allocated by a base station (such as an evolved NodeB (eNB) in Long Term Evolution (LTE)). Specifically, the base station transmits a control message used to indicate a grant resource to the vehicle terminal through a Down Link (DL). Then, the vehicle terminal transmits data on a SL according to the resource allocated by the base station. In Mode 3, the base station may allocate a resource in single transmission to the vehicle terminal, or may allocate a resource in semi-static transmission to the terminal.

Figure 2:
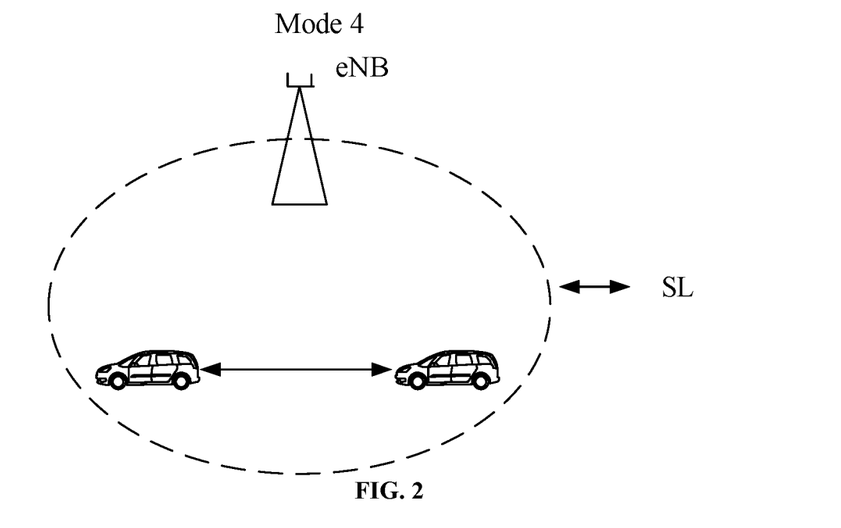
FIG. 2 is a schematic scenario diagram of Mode 4 in the V2X.

Mode 4: as illustrated in FIG. 2, the vehicle terminal uses a sensing and reservation transmission method. The vehicle terminal acquires an available transmission resource set in a sensing manner in a resource pool, and the vehicle terminal randomly selects one resource from the transmission resource set for data transmission. Since services in a V2X system have periodic characteristics, the vehicle terminal usually uses a semi-static transmission method, that is, the vehicle terminal will continuously use this resource in a plurality of transmission cycles after selecting one transmission resource, thereby reducing the probability of resource reselection and resource conflicts. The vehicle terminal would carry information that reserves the transmission resource of the next time in control information transmitted at this time, so that other terminals may determine whether this resource is reserved and used by the vehicle terminal by detecting the control information of the vehicle terminal, so as to achieve the purpose of reducing the resource conflicts.

It should be noted that in an LTE-V2X, Mode 3 is used to indicate that the transmission resource of the vehicle terminal is allocated by the base station, and Mode 4 is used to indicate that the transmission resource of the vehicle terminal is independently selected by the terminal. In an NR-V2X, a new transmission mode may be defined. The disclosure is not limited thereto.

A multi-antenna transmission technology needs to be introduced into the NR-V2X. Multiple antennas may bring the following benefits.

1) Higher transmission rate: by use of a multi-antenna multiplexing transmission method, a plurality of data streams may be transmitted on a same time-frequency resource, thereby increasing the transmission rate.

2) Larger coverage and higher reliability: by use of a beamforming technology, energy may be concentrated in a very narrow beam, thereby improving the Signal-to-Interference plus noise ratio (SINR) of the receiving end, and improving the reception success probability of a receiving end or increasing the transmission distance.

Beamforming may improve the coverage and the reliability. How does a transmitting end selects an optimal beam from a plurality of candidate beams is achieved by the following process. The transmitting end needs to perform beam scanning to perform transmission by respectively using different beams. The receiving end receives data transmitted by each beam, so that a beam with highest transmission quality may be selected as the optimal beam, and the index value of the beam is fed back to the transmitting end. In subsequent data transmission, the transmitting end may use the optimal beam for data transmission.

In the above solution, the receiving end needs to feed back an index value of the beam to the transmitting end. In addition, the receiving end also needs to feed back other types of information, such as acknowledge (ACK)/non-acknowledge (NACK), to the transmitting end. Different pieces of feedback information may enable the transmitting end to make different transmission policies.

However, the following problems mainly exist in the information feedback in the NR-V2X.

1) Time limit for information feedback: The resource of the feedback information sent by the receiving end may be acquired through competition. In a congestion scenario, it may be very difficult for the receiving end to obtain an appropriate feedback resource, or the delay of the obtained feedback resource is relatively large. The feedback information sent by using the feedback resource cannot meet the delay requirement of the transmitting end.

2) There may be two reasons why the transmitting end does not receive the feedback information.

2.1) The receiving end cannot receive the control information of the transmitting end correctly, so it cannot receive data, and the receiving end will not feed back information.

2.2) The receiving end receives the control information correctly, and detects the data and transmits the feedback information, but the transmitting end cannot detect the feedback information correctly.

At this time, how should the transmitting end stop detecting the feedback information of the receiving end.

Figure 3:
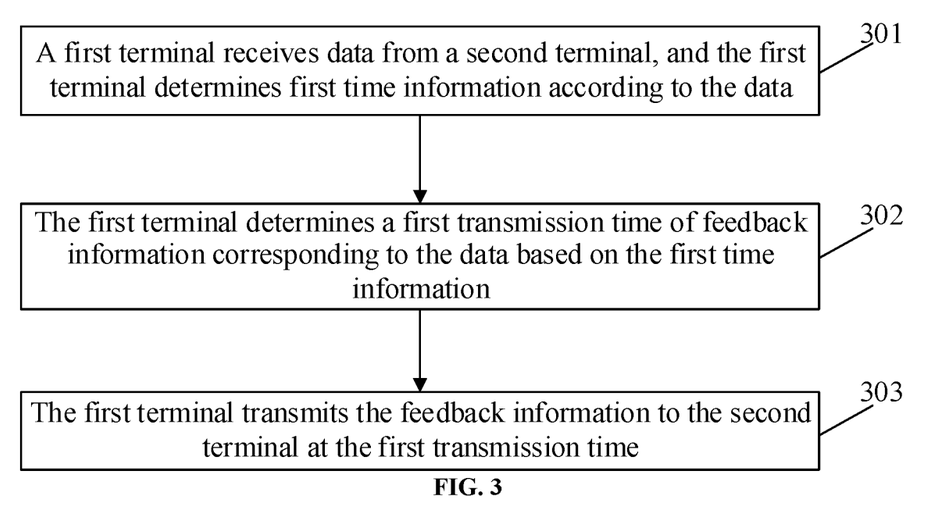
FIG. 3 is a first flow diagram of a method for information feedback according to the embodiment of the disclosure.

FIG. 3 is a first flow diagram of a method for information transmission according to the embodiment of the disclosure. As illustrated in FIG. 3, the method for information transmission includes the following steps.

In S301, a first terminal receives data sent by a second terminal, and the first terminal determines first time information according to the data.

In an embodiment of the disclosure, the types of the first terminal and the second terminal are not limited. They may be vehicle terminals, mobile phones, notebook computers, and other devices.

In an embodiment of the disclosure, the first time information is used to indicate information of maximum delay of the feedback information received by the second terminal.

In an embodiment of the disclosure, the first time information may be indicated in an explicit manner. Specifically, the first time information is carried in a PSCCH or a PSSCH. The indication is explicit through several bits in the PSCCH or the PSSCH.

In an embodiment of the disclosure, the first time information may also be indicated in an implicit manner. Specifically, the first terminal determines the first time information according to a first attribute of the data. The first attribute includes at least one of: priority information of the data, QoS information of the data, or delay information of the data. The first terminal determines the first time information according to the first attribute and a first correspondence. The first correspondence may indicate that the first time information corresponds to the first attribute.

In specific implementation, different attributes of the data correspond to different time information, and one correspondence table may be established. The correspondence table includes a plurality of correspondences. Each correspondence indicates that a correspondence between one attribute and one time information. The first terminal finds the first time information corresponding to the first attribute of the received data from the correspondence table after receiving the data sent by the second terminal.

In S302, the first terminal determines a first transmission time of feedback information corresponding to the data based on the first time information.

Hypothesis: the first terminal receives the data sent by the second terminal at a second transmission time; correspondingly:

the first terminal determines a candidate time domain resource set based on the second transmission time and the first time information, the first terminal selects the first transmission time used to transmit the feedback information from the candidate time domain resource set.

For example, the time information carried in the data sent by the second terminal is 20 ms (a maximum delay), and the second terminal transmits the data at the time n (a second transmission time). The first terminal receives the data at the time n, and acquires the time information carried therein. The first terminal selects a resource (at the first transmission time) from [n+1, n+20 ms] (a candidate time domain resource set) and transmits the feedback information.

In S303, the first terminal transmits the feedback information to the second terminal at the first transmission time.

According to the technical solution of the embodiment of the disclosure, the feedback information received by the second terminal at the first transmission time meets a delay requirement of the second terminal.

Figure 4:
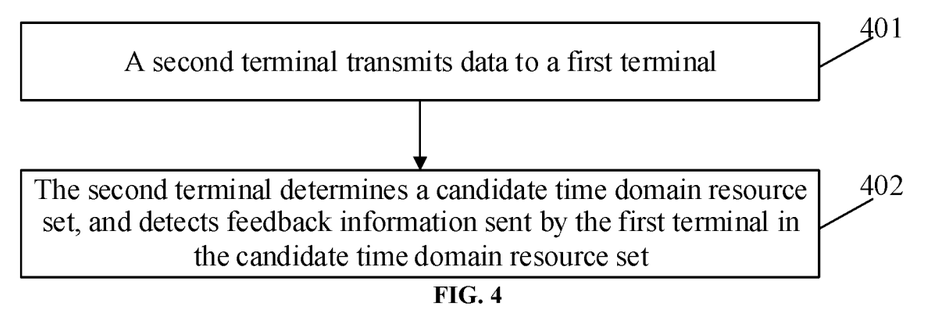
FIG. 4 is a second flow diagram of a method for information feedback according to the embodiment of the disclosure.

FIG. 4 is a second flow diagram of a method for information feedback according to the embodiment of the disclosure. As illustrated in FIG. 4, the method for information feedback includes the following steps.

In S401, a second terminal transmits data to a first terminal.

In an embodiment of the disclosure, the types of the first terminal and the second terminal are not limited. They may be vehicle terminals, mobile phones, notebook computers, and other devices.

In S402, the second terminal determines a candidate time domain resource set, and detects feedback information sent by the first terminal in the candidate time domain resource set.

In an embodiment of the disclosure, it is assumed that the second terminal transmits the data to the first terminal at a second transmission time, and the second terminal determines the candidate time domain resource set based on the second transmission time and first time information.

The first time information is used to indicate information of maximum delay of the feedback information received by the second terminal.

In an implementation, the data sent by the second terminal to the first terminal may carry the first time information. Further, the first time information is carried in a PSCCH or a PSSCH. It should be understood that the data sent by the second terminal to the first terminal may not carry the first time information, either.

In an embodiment of the disclosure, the second terminal starts a timer after transmitting the data to the first terminal at the second transmission time. A duration of the timer is determined based on the first time information.

The second terminal detects the feedback information sent by the first terminal within each time unit. After detection of one time unit, the timer is subtracted by 1.

If the second terminal detects the feedback information sent by the first terminal at the first transmission time before the timer times out, the second terminal stops detecting the feedback information and transmits the feedback information to a high-layer entity.

Responsive to that the timer times out, if the second terminal does not detect the feedback information sent by the first terminal, the second terminal stops detecting the feedback information and transmits indication information to the high-layer entity. The indication information is used to indicate that the second terminal does not detect the feedback information in the candidate time domain resource set.

For example, the second terminal detects the feedback information within a time range of [n+1, n+T] after transmitting the data at the time n. T is the information of maximum delay of the feedback information expected to be received by the second terminal. The second terminal starts the timer T1 after transmitting the data, and T1 is set as a maximum delay T of the feedback information expected to be received, such as T1=T=20 ms. The second terminal detects the feedback information in each subsequent subframe, and subtracts the timer by 1. If the feedback information is detected, the second terminal stops detecting the feedback information, and submits the feedback information to a high layer. If the feedback information is still not detected in responsive to that the timer is subtracted to 0, the second terminal stops the detection, and submits the indication information to the high layer. The indication information is used to indicate that the second terminal does not detect the feedback information or detects the feedback information overtime.

In an embodiment, the first time information is determined according to a first attribute of the data sent by the second terminal to the first terminal at the second transmission time. The first attribute includes at least one of: priority information of the data, QoS information of the data, or delay information of the data. Further, the first time information is determined according to the first attribute and a first correspondence. The first correspondence indicates that the first time information corresponds to the first attribute.

In the technical solutions of the embodiments of the disclosure, the first terminal receives the data sent by the second terminal, and the first terminal determines first time information according to the data. The first terminal determines a first transmission time of feedback information corresponding to the data based on the first time information. The first terminal transmits the feedback information to the second terminal at the first transmission time. The second terminal transmits the data to the first terminal. The second terminal determines the candidate time domain resource set and detects the feedback information sent by the first terminal in the candidate time domain resource set. By the adoption of the technical solutions of the embodiments of the disclosure, the sent data carries the delay information of the feedback information, so that a receiving end can transmit the feedback information within predetermined time. In addition, whether there is feedback information is detected within a period of time after the transmitting end transmits the data, thereby avoiding the transmitting end from ceaselessly detecting the feedback information due to a detection failure.

Figure 5:
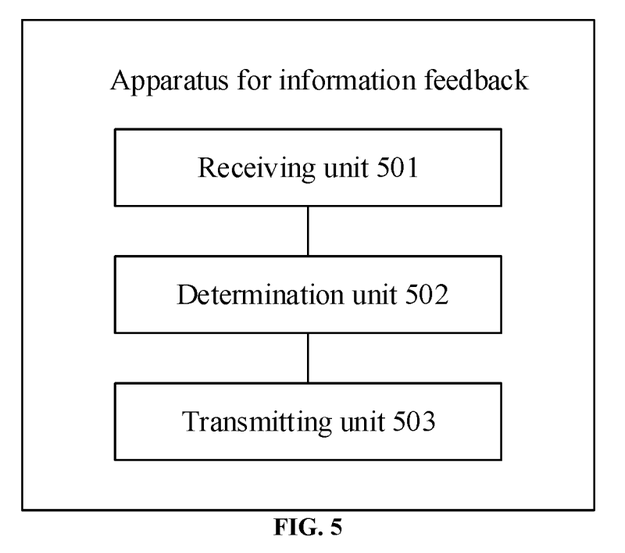
FIG. 5 is a first schematic diagram of a structural composition of an apparatus for information feedback according to the embodiment of the disclosure.

FIG. 5 is a first schematic diagram of a structural composition of an apparatus for information feedback according to the embodiment of the disclosure. As illustrated in FIG. 5, the information feedback apparatus includes:

a receiving unit 501, configured to receive data sent by a second terminal;

a determination unit 502, configured to determine first time information according to the data, and determine a first transmission time of feedback information corresponding to the data based on the first time information; and a transmitting unit 503, configured to transmit the feedback information to the second terminal at the first transmission time.

In an implementation, the first time information is used to indicate information of maximum delay of the feedback information received by the second terminal.

In an implementation, the receiving unit receives the data sent by the second terminal at the second transmission time.

The determination unit 502 is configured to determine a candidate time domain resource set based on the second transmission time and the first time information, and select the first transmission time used to transmit the feedback information from the candidate time domain resource set.

In an implementation, the first time information is carried in a PSCCH or a PSSCH.

In an implementation, the determination unit 502 is configured to determine the first time information according to a first attribute of the data. The first attribute includes at least one of:

priority information of the data, Qos information of the data, or delay information of the data.

In an implementation, the determination unit 502 is configured to determine the first time information according to the first attribute and a first correspondence. The first correspondence indicates that the first time information corresponds to the first attribute.

Those skilled in the art should understand that a realized function of each unit in the apparatus for information feedback illustrated in FIG. 5 may be understood with reference to the related description of the method for information feedback. The function of each unit in the apparatus for information feedback illustrated in FIG. 5 may be realized through a program on a processor, or may be realized through a specific logic circuit.

Figure 6:
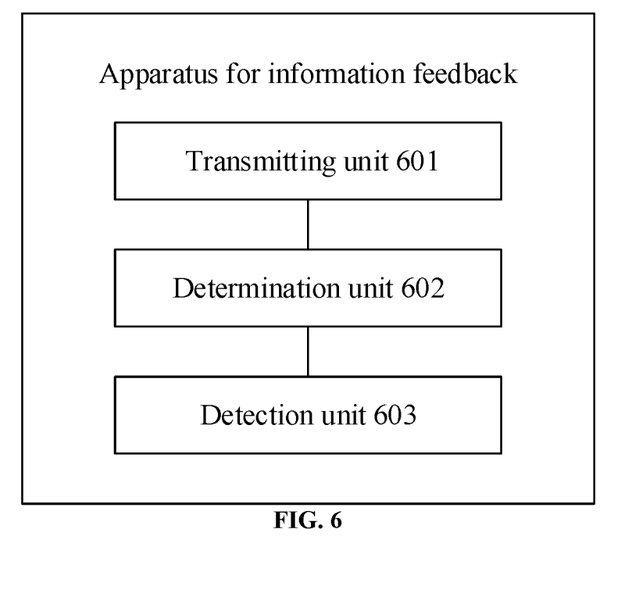
FIG. 6 is a second schematic diagram of a structural composition of an apparatus for information feedback according to the embodiment of the disclosure.

FIG. 6 is a second schematic diagram of a structural composition of an apparatus for information feedback according to the embodiment of the disclosure. As illustrated in FIG. 6, the apparatus for information feedback includes:

a transmitting unit 601, configured to transmit data to a first terminal;

a determination unit 602, configured to determine a candidate time domain resource set; and a detection unit 603, configured to detect feedback information sent by the first terminal in the candidate time domain resource set.

In an implementation, the transmitting unit 601 transmits the data to the first terminal at a second transmission time.

The determination unit 602 is configured to determine the candidate time domain resource set based on the second transmission time and the first time information.

The first time information is used to indicate information of maximum delay of the feedback information received by the second terminal.

In an implementation, the detection unit 603 is configured to start a timer after transmitting the data to the first terminal at the second transmission time. A duration of the timer is determined based on the first time information. If the second terminal detects the feedback information sent by the first terminal at the first transmission time before the timer times out, the second terminal stops detecting the feedback information and transmits the feedback information to a high-layer entity. Responsive to that the timer times out, if the second terminal does not detect the feedback information sent by the first terminal, the second terminal stops detecting the feedback information and transmits indication information to the high-layer entity. The indication information is used to indicate that the second terminal does not detect the feedback information in the candidate time domain resource set.

In an implementation, the data sent by the second terminal to the first terminal carries the first time information.

In an implementation, the first time information is carried in a PSCCH or a PSSCH.

In an implementation, the first time information is determined according to a first attribute of the data sent by the second terminal to the first terminal at the second transmission time.

In an implementation, the first attribute includes at least one of: priority information of the data, QoS information of the data, or delay information of the data.

In an implementation, the operation that the first time information is determined according to the first attribute of the data sent by the second terminal to the first terminal at the second transmission time includes the following operation.

The first time information is determined according to the first attribute and a first correspondence. The first correspondence indicates that the first time information corresponds to the first attribute.

Those skilled in the art should understand that a realized function of each unit in the apparatus for information feedback illustrated in FIG. 6 may be understood with reference to the related description of the method for information feedback. The function of each unit in the apparatus for information feedback illustrated in FIG. 6 may be realized through a program on a processor, or may be realized through a specific logic circuit.

The above technical solutions of the embodiments of the disclosure are not only suitable for a V2X system, but also suitable for other end-to-end communication systems. The terminals in the embodiments of the disclosure may be vehicle terminals, handheld terminals, Personal Digital Assistants (PDAs), wearable terminals, and the like.

The foregoing apparatus for information feedback of the embodiments of the disclosure, if implemented in the form of a software functional module and sold or used as a standalone product, may also be stored in a computer readable storage medium. Based on such understanding, the technical solutions of the embodiments of the disclosure or parts that make contribution to the prior art may be embodied in the form of a software product, and a computer software product is stored in a storage medium, including a plurality of instructions configured to cause a computer device (which may be a personal computer, a server, a network device, and the like) to execute all or part of the methods of the various embodiments of the disclosure. The foregoing storage medium includes: a U disk, a mobile hard disk, a Read Only Memory (ROM), a Random Access Memory (RAM), a magnetic disk or an optical disk and other media that can store program codes. Therefore, the embodiments of the disclosure are not limited to any particular hardware and software combinations.

Correspondingly, the embodiments of the disclosure further provides a computer storage medium that may store a computer-executable instruction. The computer-executable instruction, when executed by a processor, implements the above information feedback method.

Figure 7:
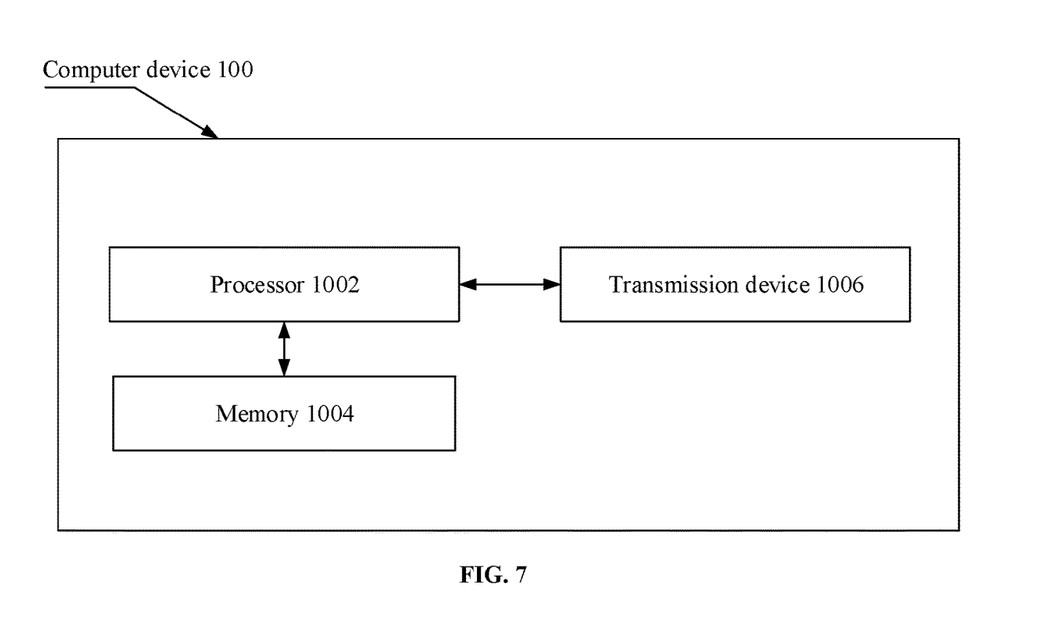
FIG. 7 is a schematic diagram of a structural composition of a computer device according to the embodiment of the disclosure.

FIG. 7 is a schematic diagram of a structural composition of a computer device according to the embodiment of the disclosure. The computer device of the embodiment of the disclosure may be any type of terminal. As illustrated in FIG. 7, the computer device 100 may include one or more (only one is illustrated in the figure) processors 1002 (the processor 1002 may include, but is not limited to, a processing apparatus such as a Micro Controller Unit (MCU) or a Field Programmable Gate Array (FPGA), a memory 1004 configured to store data, and a transmission device 1006 for a communication function. Those of ordinary skill in the art can understand that the structures illustrated in FIG. 7 are only schematic, and do not limit the structure of the electronic apparatus. For example, the computer device 100 may further include more or fewer components than those illustrated in FIG. 7, or have a different configuration from that illustrated in FIG. 7.

The memory 1004 may be configured to store software programs and modules of application software, such as a program instruction/module corresponding to the method for information feedback in the embodiments of the disclosure. The processor 1002 executes various function applications and data processing by operating the software programs and modules stored in the memory 1004, so as to implement the above method. The memory 1004 may include a high-speed Random Access Memory (RAM), and may further include a non-volatile memory, such as one or more magnetic storage apparatuses, a flash memory, or other non-volatile solid-state memories. In some examples, the memory 1004 may further include a memory remotely disposed with respect to the processor 1002, and these remote memories may be connected to the computer device 100 through a network. Examples of the above network include, but are not limited to, the Internet, an intranet, a local area network, a mobile communication network, and combinations thereof.

The transmission device 1006 is configured to receive or transmit data via a network. The specific example of the network may include a wireless network provided by a communication provider of the computer device 100. In an example, the transmission device 1006 includes a Network Interface Controller (NIC), which may be connected to other network devices through a base station, so as to communicate with the Internet. In one example, the transmission device 1006 may be a Radio Frequency (RF) module, which is configured to communicate with the Internet in a wireless manner. The receiving unit and the transmitting unit in the apparatus for information transmission may be implemented by the transmission device or a transceiver.

The technical solutions described in the embodiments of the disclosure may be arbitrarily combined without a conflict.

In the several embodiments provided by the disclosure, it should be understood that the disclosed method and smart device may be implemented in other ways. The device embodiments described above are merely illustrative. For example, the division of the units is only logical function division. In actual implementation, there may be another division manner. For example, a plurality of units or components may be combined, or integrated into another system, or some features may be ignored or not executed. In addition, the mutual coupling or direct coupling or communication connection between the various components illustrated or discussed may be indirect coupling or communication connection through some interfaces, devices or units, or may be in electrical, mechanical or other forms.

The above units described as separate components may or may not be physically separated, and the components displayed as units may or may not be physical units. That is, they may be located in one place or distributed to multiple network units. Part or all of the units may be selected according to actual needs to achieve the purpose of the solutions of the disclosure.

In addition, each functional module in each embodiment of the disclosure may be integrated into one second processing unit, or each unit may be separately used as one unit, or two or more units may be integrated into one unit. The above integrated units may be implemented in the form of hardware, or in the form of hardware and software functional units.

The above is only specific implementations of the disclosure, but the protection scope of the disclosure is not limited to this. Any person skilled in the art can easily think of changes or replacements within the technical scope disclosed by the disclosure. The changes or replacements should be covered by the protection scope of the disclosure.

The invention claimed is:

1. A method for information feedback, comprising:
   receiving, by a first terminal, data from a second terminal, and determining, by the first terminal, first time information according to the data, wherein the first time information is carried in the data received from the second terminal;

determining, by the first terminal, a first transmission time of feedback information based on the first time information; and transmitting, by the first terminal, the feedback information to the second terminal at the first transmission time, wherein the first time information is used to indicate information of maximum delay of the feedback information received by the second terminal.

2. The method of claim 1, wherein the first terminal receives the data sent by the second terminal at a second transmission time;

determining, by the first terminal, the first transmission time of the feedback information based on the first time information comprises:

determining, by the first terminal, a candidate time domain resource set based on the second transmission time and the first time information; and selecting, by the first terminal, the first transmission time used to transmit the feedback information from the candidate time domain resource set.

3. The method of claim 1, wherein the first time information is carried in a Physical Sidelink Control Channel (PSCCH) or a Physical Sidelink Shared Channel (PSSCH).

4. The method of claim 1, wherein determining, by the first terminal, the first time information according to the data comprises:

determining, by the first terminal, the first time information according to a first attribute of the data, wherein the first attribute comprises at least one of:

priority information of the data, Quality of Service (Qos) information of the data, or delay information of the data.

5. The method of claim 4, wherein determining, by the first terminal, the first time information according to the first attribute of the data comprises:

determining, by the first terminal, the first time information according to the first attribute and a first correspondence; and the first correspondence indicates that the first time information corresponds to the first attribute.

6. An apparatus for information transmission, comprising:
a transceiver, configured to receive data from a second terminal; and a processor, configured to determine first time information according to the data and determine a first transmission time of feedback information based on the first time information wherein the first time information is carried in the data received from the second terminal;

wherein the transceiver is further configured to transmit the feedback information to the second terminal at the first transmission time, and the first time information is used to indicate information of maximum delay of the feedback information received by the second terminal.

7. The apparatus of claim 6, wherein the transceiver receives the data sent by the second terminal at the second transmission time;

the processor is configured to determine a candidate time domain resource set based on the second transmission time and the first time information, and select the first transmission time used to transmit the feedback information from the candidate time domain resource set.

8. The apparatus of claim 6, wherein the first time information is carried in a Physical Sidelink Control Channel (PSCCH) or a Physical Sidelink Shared Channel (PSSCH).

9. The apparatus of claim 6, wherein the processor is configured to determine the first time information according to a first attribute of the data; and the first attribute comprises at least one of:

priority information of the data, Quality of Service (Qos) information of the data, or delay information of the data.

10. The apparatus of claim 9, wherein the processor is configured to determine the first time information according to the first attribute and a first correspondence;

and the first correspondence indicates that the first time information corresponds to the first attribute.

11. A non-transitory computer storage medium having stored therein computer executable instructions that when executed by a processor, implement the steps of:

receiving, by a first terminal, data from a second terminal, and determining, by the first terminal, first time information according to the data, wherein the first time information is carried in the data received from the second terminal;

determining, by the first terminal, a first transmission time of feedback information based on the first time information; and transmitting, by the first terminal, the feedback information to the second terminal at the first transmission time, wherein the first time information is used to indicate information of maximum delay of the feedback information received by the second terminal.

12. The non-transitory computer storage medium of claim 11, wherein the first terminal receives the data sent by the second terminal at a second transmission time;

determining, by the first terminal, the first transmission time of the feedback information based on the first time information comprises:

determining, by the first terminal, a candidate time domain resource set based on the second transmission time and the first time information; and selecting, by the first terminal, the first transmission time used to transmit the feedback information from the candidate time domain resource set.

13. The non-transitory computer storage medium of claim 11, wherein the first time information is carried in a Physical Sidelink Control Channel (PSCCH) or a Physical Sidelink Shared Channel (PSSCH).

14. The non-transitory computer storage medium of claim 11, wherein determining, by the first terminal, the first time information according to the data comprises:

determining, by the first terminal, the first time information according to a first attribute of the data, wherein the first attribute comprises at least one of:

priority information of the data, Quality of Service (Qos) information of the data, or delay information of the data.

15. The non-transitory computer storage medium of claim 14, wherein determining, by the first terminal, the first time information according to the first attribute of the data comprises:

determining, by the first terminal, the first time information according to the first attribute and a first correspondence; and the first correspondence indicates that the first time information corresponds to the first attribute.

* * * * *